United States Patent [19]

Eaton

[11] Patent Number: 5,167,826
[45] Date of Patent: Dec. 1, 1992

[54] ENGINE COLLANT RECYCLING APPARATUS AND PROCESS
[75] Inventor: Edward R. Eaton, Tolland, Conn.
[73] Assignee: Stanadyne Automotive Corp., Windsor, Conn.
[21] Appl. No.: 725,351
[22] Filed: Jul. 3, 1991
[51] Int. Cl.⁵ .................. B01D 61/02; B01D 61/06
[52] U.S. Cl. ............................ 210/651; 210/652; 210/195.2; 210/257.2
[58] Field of Search .............. 210/651, 195.2, 634, 210/644, 652, 195.2, 257.2, 321.6, 321.72, 167, 171

[56] References Cited

U.S. PATENT DOCUMENTS 4,357,236 11/1982 Krueger ...................... 210/195.2
4,946,595 8/1990 Miller ........................... 210/651

Primary Examiner—Frank Sever
Attorney, Agent, or Firm—Chilton, Alix & Van Kirk

[57] ABSTRACT

An apparatus and a process for recycling used engine coolant employs a reverse osmosis process for separating ethylene glycol from a concentrate coolant solution. The engine coolant concentrate is pre-filtered through a series of filters and pressurized prior to being passed through a semi-permeable membrane. The membrane separates the feed stream into a permeate solution of ethylene glycol and water and concentrate solution. The concentrate solution is returned to a concentrate tank for continuous circulation through the apparatus. A heat exchanger maintains the temperature of the concentrate solution below a pre-established threshold.

33 Claims, 5 Drawing Sheets

ENGINE COLLANT RECYCLING APPARATUS AND PROCESS

BACKGROUND OF THE INVENTION

This invention relates generally to glycol base engine coolants which are commonly used in internal combustion engines. More particularly, the present invention relates to an apparatus and a process for recycling used engine coolant.

Engine coolants which are conventionally employed to lower the freezing point or increase the boiling point of water in internal combustion engines commonly contain ethylene glycol as the base or primary additive component. Engine coolant typically has a glycol concentration of 40 to 70% concentration in water. When engine coolant is added to an internal combustion engine cooling system in sufficient concentration, the resulting coolant fluid provides protection against freezing to below −30° F. and protection against boiling to an excess of 200° F. While engine coolants are universally used in fluid cooled internal combustion engines, there are significant limitations to the useful life of such coolants. The glycol components of the coolant over time chemically break down into organic acids such as, for example, glycolic, formic and glyoxolic acids. The pH factor of the engine coolant composition also gradually decreases over time from a pH of approximately 10.

The coolant solution circulation through an engine cooling system under certain conditions produces a highly corrosive effect on all metals within the cooling system. When the pH factor decreases below approximately 8.3, the corrosive process forces steel and iron from the coolant system components into solution and also results in aluminum pitting. It has also been established that copper corrodes upon extended exposure to the engine coolant solution and also eventually dissolves into the solution. Zinc, which is conventionally employed to strengthen the solder in radiators, weakens due to engine coolant exposure so that leaks develop in the coolant system. In addition, over time the engine coolant concentration of potentially damaging suspended particulate matter, including corrosive products, dirt, silt and hard water salt deposits increases.

Because of the well established corrosive effects of the circulating coolant, corrosion inhibitors are conventionally added directly to the engine coolant. Over a period of time, the inhibitors are consumed and the engine coolant eventually produces significant corrosive effects throughout the coolant system. Consequently, the implementation of certain maintenance procedures is required for extended coolant usage. The most common procedure is to remove and replace the engine coolant composition after a pre-established time period. In some instances, cooling system additives, which are alkaline and include corrosion inhibitors, are directly added to the coolant to enhance the coolant properties, decrease the corrosive effects and postpone replacement of the coolant.

Recycling used engine coolant has become increasingly advantageous due to two significant factors. First, engine coolant, and in particular ethylene glycol, in some states and localities has been designated a hazardous waste. Federal and state environmental protection agencies have instituted strict regulation of the disposal of used engine coolant. In some cases, the disposal of engine coolant requires imposition of waste disposal fees and surcharges. Secondly, ethylene glycol, the principal component of engine coolant, has also become an increasingly more expensive product. In some instances, there have been significant shortages in the supply of ethylene glycol. Consequently, there are economic pressures to recycle engine coolant and recover the ethylene glycol component in an efficient and cost effective manner.

A number of processes and systems have been advanced as possible commercially viable solutions to the desirability of recycling engine coolant. Most of the processes have employed ion exchange and/or distillation techniques in various forms. Distillation of used engine coolant produces an acceptable end product but is relatively expensive and is a relatively slow process which is not very suitable for small onsite service centers. The distillation equipment is relatively capital intensive and requires significant energy consumption. In addition, relatively complex chemical and filtering techniques have been employed apart from and in conjunction with distillation for recovering and recycling used engine coolant. Quality control has also been a significant problem associated with some commercial engine coolant recycling systems.

U.S. Pat. No. 4,946,595 discloses a process for physically and chemically treating used engine coolant of a type which contains one or more glycol and/or alcohol based antifreeze components. The disclosed process includes the steps of oxidation with one or more known oxidizing agents, precipitation with one or more known salt forming agents, as well as filtration. Chemical additives are added to enhance the oxidation and precipitation. Various corrosion inhibitors and buffering agents are also added to adjust the pH of the recovered solution.

SUMMARY OF THE INVENTION

Briefly stated, the invention in a preferred form is an apparatus and a process which is employed for recycling the glycol components of used engine coolant. The apparatus employs a concentrate container for receiving the used engine coolant to be recycled. The used engine coolant is continuously circulated along a flow path in a loop-like fashion. The recovered engine coolant or nearly pure permeate is deposited in a permeate container. The engine coolant is filtered to remove various particulate substances from the used coolant. The filtered coolant is pressurized to a pressure typically in the range of 50 to 500 psi. The pressurized solution is passed along a semi-permeable membrane wherein glycol and water are separated from the used concentrated coolant by a reverse osmosis process. The membrane may have a cylindrical structure wherein the glycol and water passes to the middle of the membrane and flows in a longitudinal direction. The recovered glycol and water are transported to the permeate container. The separated coolant concentrate solution is returned to the coolant container for recirculation through the recycling system.

A three stage filter system may be employed. A suction pressure is applied to circulate coolant prior to filtering. In one embodiment, an air cooled heat exchanger is employed to ensure that the coolant concentrate which is exposed to the semi-permeable membrane in the reverse osmosis stage does not exceed 120° F. Various temperature gauges, pressure gauges and relief valves are employed to ensure that the system is operating in an efficient and reliable manner.

An object of the invention is to provide a new and improved apparatus and process for recycling used engine coolant.

Another object of the invention is to provide a new and improved apparatus and process wherein used engine coolant may be recycled in a relatively inexpensive and efficient manner.

A further object of the invention is to provide a new and improved apparatus and process for recovering used engine coolant which upon addition of suitable additives results in a recycled coolant composition having effective corrosion inhibitor properties, effective freeze and boil protection properties, a pH factor which is between approximately 9.5 and 10.5 and additional properties which satisfy standard specifications for engine coolant.

A yet further object of the invention is to provide a new and improved apparatus and process for recycling engine coolant which apparatus and process are capable of separating a high percentage of glycol and water from the coolant and do not require distillation or other energy intensive processes.

Other objects and advantages of the invention will be apparent from the drawings and the specification.

DETAILED DESCRIPTION OF THE PREFERRED EMBODIMENT

Figure 1:
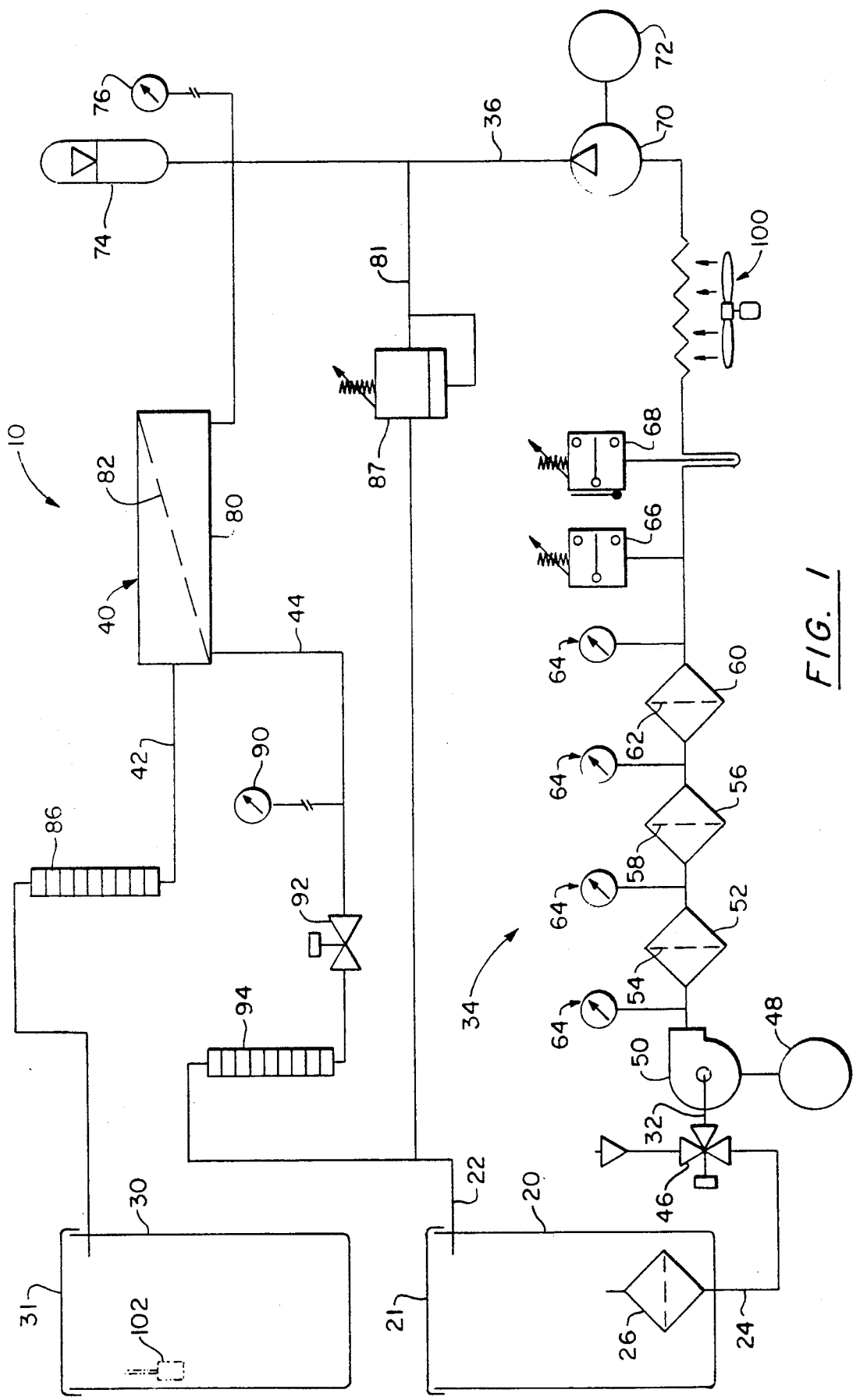
FIG. 1 is a schematic diagram of an apparatus for recycling engine coolant in accordance with the present invention.
Figure 3:
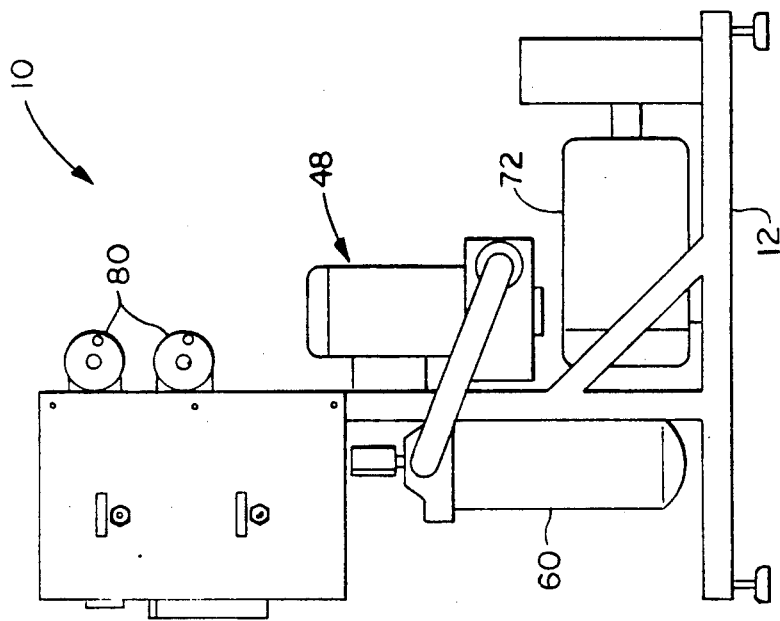
FIG. 3 is a side elevational view of the apparatus of FIG. 2.
Figure 2:
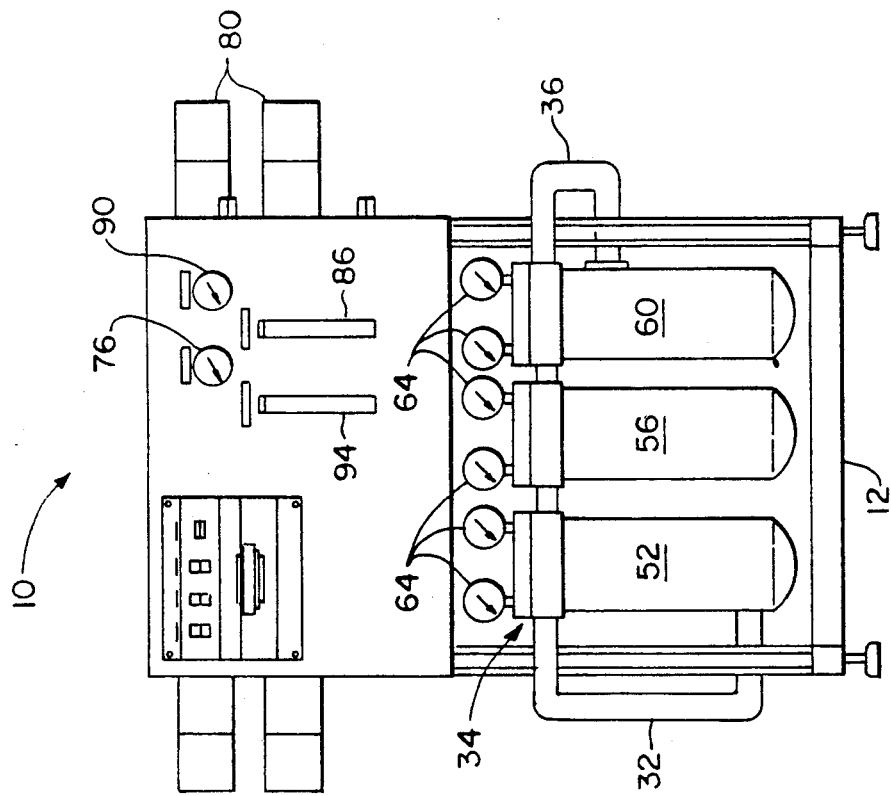
FIG. 2 is a front elevational view of the apparatus of FIG. 1.

With reference to the drawings wherein like numerals represent like parts throughout the figures, an apparatus for recycling engine coolant is generally designated by the numeral 10. The apparatus 10 receives used engine coolant and processes the coolant to recover ethylene glycol and water which may be then used as the primary ingredient to produce a new engine coolant solution. The apparatus 10 is a relatively compact system which may be, for example, mounted on a skid 12 and operated at service centers, fleet garages and other facilities having significant quantities of recyclable used engine coolant. In one embodiment, the apparatus (except the input and end product containers) is arranged in a compact skid-mounted configuration of approximately 4 ft. × 4 ft. × 4½ ft. Alternately, the containers or holding tanks may be integrated into the skid-mounted configuration.

The used engine coolant (concentrate) is placed in a storage tank 20 which may be a 50 gallon polyethylene drum or similar receptacle. The tank 20 has a cover 21 which may be removed for depositing the initial concentrate to be recycled. The tank has an inlet conduit 22 and an outlet conduit 24 which provide fluid communication with the processing components. A 100 mesh suction strainer 26 is interposed across the outlet conduit 24 at the interior lower portion of the storage tank. The recycling process is a continuous non-distillation separation process wherein the ethylene glycol and water are continuously removed from the concentrate solution with the remaining separated solution being returned to the storage tank 20 through the inlet conduit 22.

As the apparatus continuously operates without additional used coolant being added to the concentrate tank 20, the solution in the tank progressively becomes more concentrated due to the cyclical removal of the ethylene glycol and water. The ethylene glycol and water solution (permeate), which constitutes the nearly pure recyclable material, is deposited in a permeate storage tank 30. Permeate tank 30 may be similar in structure to tank 20. The permeate storage tank 30 thus contains the nearly pure or permeate solution which is separated by the apparatus 10 and forms the primary material for a new engine coolant solution. Permeate tank 30 also has a cover 31 which may be removed to permit the introduction of additives to produce the new engine coolant solution as described below.

A fuse box 23 is interposed between a pair of pump motors described below, a control transformer 25 and an external power source. In a preferred embodiment, the apparatus operates on a 230 VAC, single phase, 60 hz power source. A manual power on switch 27 is manually activated to supply power to the apparatus. The power up pilot light 29 is energized when the power switch 27 is in the "on" position.

The flow path through the apparatus is defined by several conduits. In general, the outlet conduit 24 communicates with a conduit 32 which leads to a pre-filter unit 34. A transfer conduit 36 transfers the filtered solution to a reverse osmosis separator station 40 from which the nearly pure portion of the separated permeate is transferred to the permeate storage tank 30 via a permeate conduit 42 and the concentrated portion of the solution is returned to the concentrate storage tank via a return conduit 44.

Communication through the outlet conduit 24 to the pre-filter unit 34 is controlled by a three-way ball valve 46 which may be a one inch PVC valve. Valve 46 may be connected to an external water source (not illustrated) for cleaning the fluid exposed portions of the apparatus. A pump drive motor 48 drives a centrifugal filter pump 50 which produces a suction pressure for circulating the solution through the pre-filter unit 34. In a preferred embodiment, three filter stages are positioned in series along the concentrate flow path. Filter housing 52 employs a 50 micron filter 54 in the first filter stage, filter housing 56 employs a 20 micron filter 58 in the second stage, and filter housing 60 employs a 5 micron filter 62 in the third filter stage. The filtered waste material collects on the filters and the filters are periodically replaced. Filter pressure monitor gauges 64 are interposed in the flow path upstream and downstream from each of the filter units to monitor the pressure drops across the filter stages, so that any clogging or defect in the filtering units can be easily detected, and collected waste materials can be appropriately removed and the filters replaced.

During the pre-filter stage, particulate substances having a diameter in excess of 5 microns are effectively removed from the concentrate solution and deposited on the filter elements. A low inlet pressure switch 66 monitors the pressure of the filtered concentrate solution exiting the pre-filter stage. Switch 66 communicates with a relay 67 which communicates with a flashable alarm light 65 to terminate the operation if the pressure of the filtered concentrate solution does not exceed a pre-established threshold such as, for example, 25 psi. A high temperature switch 68 which is electrically wired in parallel with switch 66 also communicates via relay 67 with alarm light 65 for monitoring the temperature of the filtered concentrate for terminating operation if the temperature of the exiting filter concentrate solution exceeds a pre-established temperature threshold such as, for example 120° F.

The filtered concentrate is transferred to the reverse osmosis separator station. The solution feed stream to station 40 is pressurized to a pressure in the range of approximately 50 to 500 psi by means of a plunger pump 70 which is driven by a pump drive motor 72. A preferred pressure range is 100 to 400 psi. A pulsation dampener 74 is employed to reduce the turbulence in the concentrate flow path. Switch 66 essentially senses a low pressure, such as less than 25 psi, on the suction side of the pump 70. A pressure gauge 76 downstream from pump 70 monitors the input pressure of the solution to a separator housing 80 of the reverse osmosis separator station 40. A relief conduit 81 communicates with the transfer conduit 36 and is controlled by a safety relief valve 87 to provide a relief path for by-passing the separator station should the pressure exceed a pre-established pressure threshold, such as, for example, 500 psi. The relief path communicates with the return conduit 44 and returns solution to the concentrate storage tank. A reset switch 69 communicates with a reset relay 71 to close a relay contact 65 which completes an electrical circuit to start motors 48 and 72 in a pre-established delay sequence. Reset relay 71 also terminates any alarm condition implemented by switches 66, 68 and 102.

Figure 4:
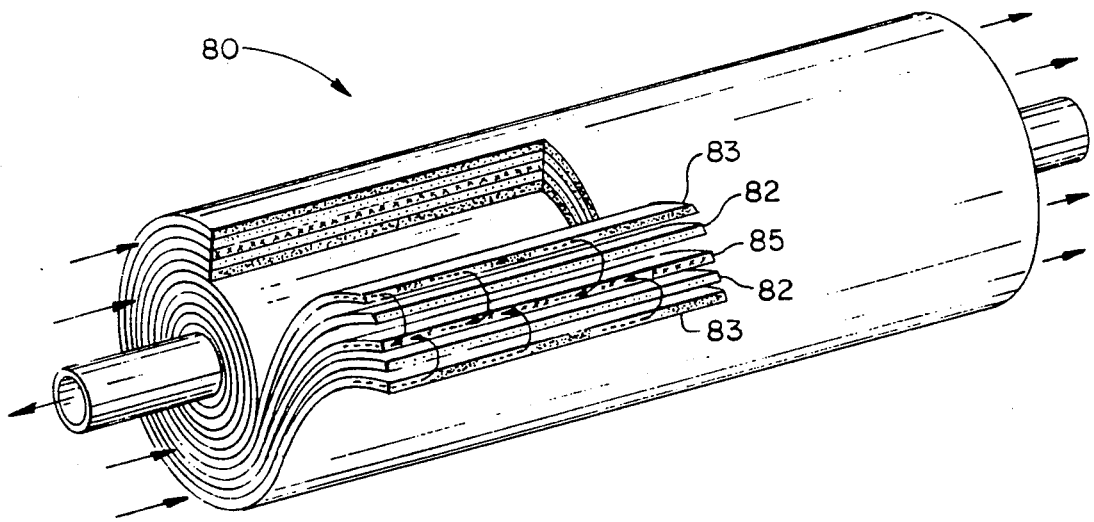
FIG. 4 is a perspective view, partly broken away and partly in schematic, of a reverse osmosis unit employed in the apparatus of FIG. 1.
Figure 5:
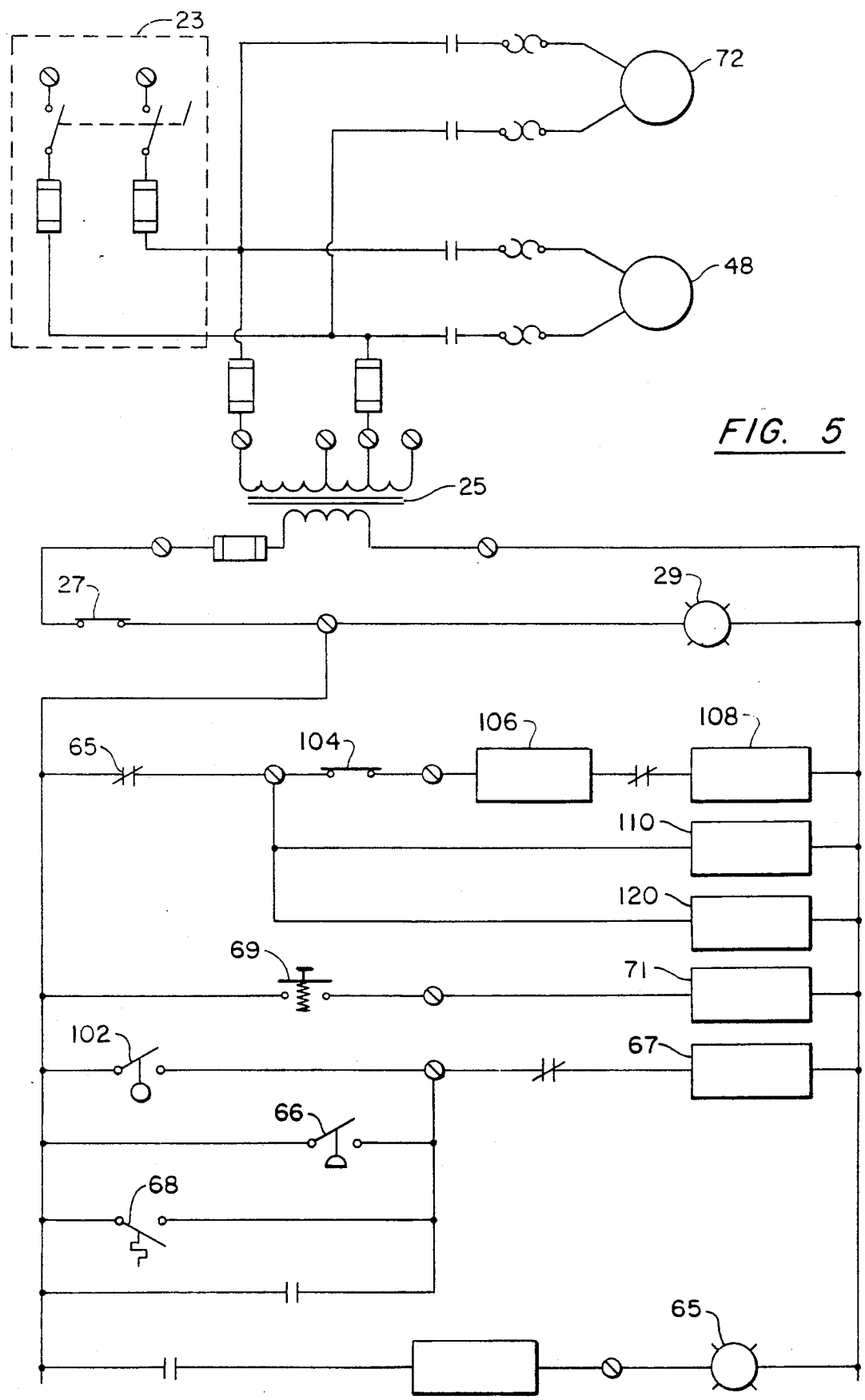
FIG. 5 is an electrical schematic diagram for the apparatus of FIG. 1.

With additional reference to FIG. 4, the separator housing 80 contains a cylindrical semi-permeable membrane 82. The semi-permeable membrane 82 may be a membrane element such as employed in water desalinization systems. The membrane 82 essentially functions to selectively allow ethylene glycol and water material to pass through the membrane and thereby separate from the remaining pressurized concentrate coolant solution. The membrane 82 has a spiral configuration. Spacers 83 between the membrane coils prevent excessive solid material collection on the surface of the membrane. A carrier media 85 conducts permeate toward the middle. A preferred membrane 82 has a fluoridated hydrocarbon composition. The membrane preferably has salt rejection properties which range from 50-95% depending on the salt content of the solution. In one embodiment, membrane 82 has a 4 inch diameter and a length of 40 inches. Multiple membranes arranged in series (not illustrated) may also be employed.

The directional flow of the separated permeate is generally longitudinal to the flow of the feed stream impinging the membrane 82 and the remaining concentrate which does not pass through the membrane. The separated permeate flows axially along the central channel formed by the membrane. The flux rate or volume of separated permeate passing through the membrane per 24 hour time period is approximately 5 gallons of solution per square feet of membrane surface per 24 hours. The low flux rate prevents excessive clogging and fouling of the membrane.

The separated ethylene glycol and water solution is transferred via the permeate conduit 42 through a permeate flow meter 86. The remaining concentrated portion of the solution is returned via the return conduit to the concentrate storage tank 20. The rate of flow of the concentrated solution through the return conduit is 30 to 50 times greater than the permeate flow rate through the permeate conduit 42. During the course of the continuous recycling, the contaminant concentration of the concentrate solution will be typically increased five to fifteen times the contaminant concentration of the original solution. During each pass of concentration solution through the separator station 40, less than 8%, and preferably 2-4%, of the concentrate solution permeate through the membrane 82.

A pressure gauge 90 and a needle valve 92 are interposed in the return conduit. Needle valve 92 is pre-set to maintain the driving pressure required to ensure proper operation of the reserve osmosis membrane 82. If the feed stream does not have a sufficient flow rate, the membrane will clog and become ineffective. The return solution passes through a concentrate flow meter 94 for return to the tank inlet conduit 22.

A heat exchanger 100 which may be an air cooled heat exchanger is interposed in the circulation path to stabilize the concentrate fluid temperature at approximately 60°-80° F. The temperature is preferably maintained at a temperature below 120° in order to ensure proper functioning of the reverse osmosis membrane 82 as well as the other processing portions of the system. With reference to FIG. 1, the heat exchanger 100 may be located downstream from the pre-filter stage and upstream from the pump 70. The heat exchanger may also be located in the return conduit downstream from the separator station 40 or at other suitable locations.

A level switch 102 is mounted in the permeate storage tank. The level switch is wired in parallel with pressure switch 66 and temperature switch 68 for terminating operation of the apparatus processing units when the level in the permeate storage tank exceeds a pre-established threshold.

Figure 7:
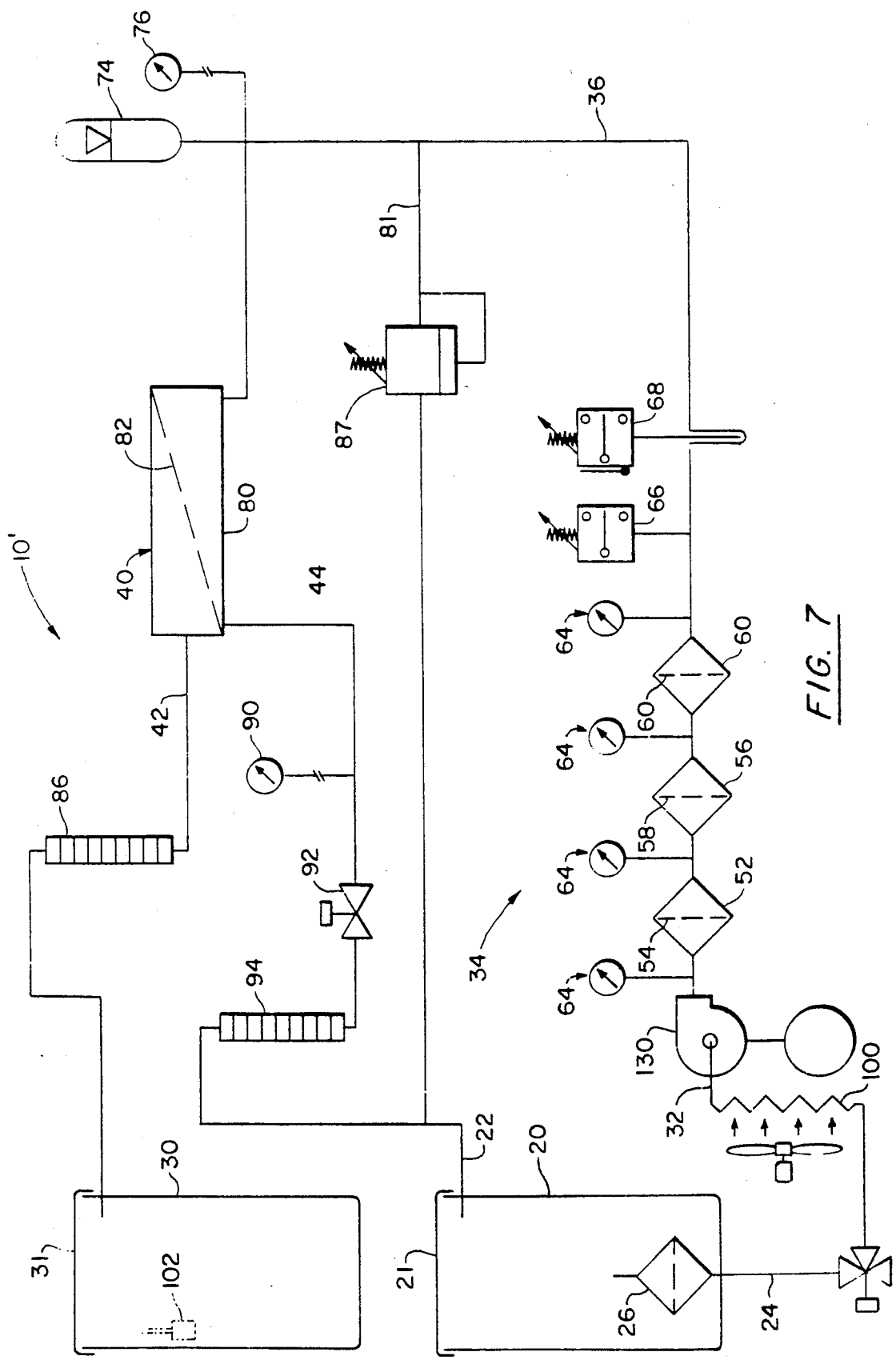
FIG. 7 is a schematic diagram of a second embodiment of an apparatus for recycling engine coolant.

With reference to FIG. 7, the recycling apparatus may alternately be configured so that the heat exchanger 100 is positioned between the concentrate tank 20 and a circulation pump 130. Pump 130 provides sufficient pressure to circulate the solutions along the described flow paths and to accomplish reverse osmosis separation at the separator station 40. Pump 130 is positioned upstream from the pre-filter unit 34. A second pump is not required in the FIG. 7 embodiment.

After a batch has been run, the system may be cleaned by introducing water through valve 46. The permeate conduit 42 is closed or diverted to the concentrate tank. A two position run-clean switch 104 is set to the "clean" position to provide electrical communication with motor contactor 110 and hour meter 120 and by-pass the pump 48. In the "run" mode, motor contactor 108 is energized along with timer 106.

Figure 6:
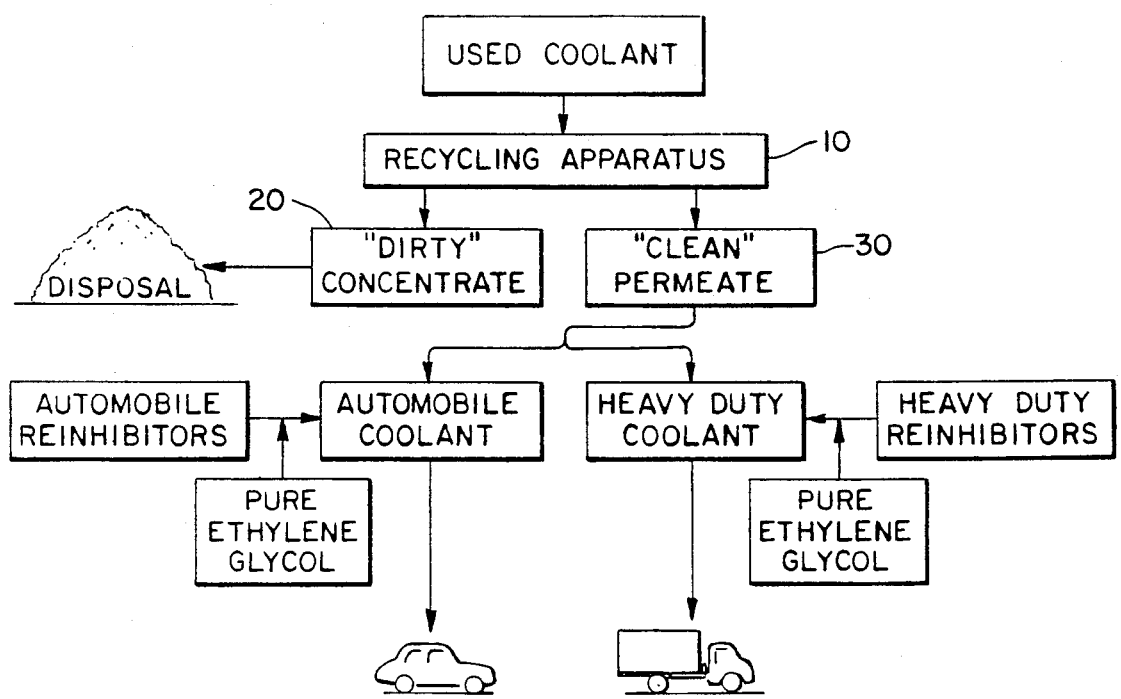
FIG. 6 is a flow diagram illustrating the engine coolant recycling process in accordance with the present invention.

With reference to FIG. 6, the permeate solution is tested for ethylene glycol concentration by means of a refractometer or other suitable method. The permeate solution is then converted to a coolant solution suitable for usage in a vehicle. The conversion process is primarily dependent upon whether the coolant is to be used for heavy duty usage or for conventional automotive usage. In both instances, pure ethylene glycol is added to the solution to bring the solution up to the desired concentration. The concentration may be determined by a refractometer. Either heavy duty reinhibitors or automotive reinhibitors are then added to the solution. Stabilizers to prevent the precipitation of inhibitors may also be added. The additive process may have two discrete adding and mixing steps within the permeate container 30. The inhibitors may include nitrite, nitrate, borate, silicate, silicon, tolytriazole, benzoate, phosphate and molybdate. The resulting solution satisfies the standard specification for ethylene glycol base engine coolant including freezing, boiling and corrosion resistance standards. The solution is then suitable for usage in the vehicle.

In a normal recycling process for an embodiment of apparatus 10 as described, approximately 15 to 20% of the used engine coolant solution which is put into the concentrate tank eventually becomes a dirty concentrate solution which must be removed or disposed of. Approximately 80 to 85% of the glycol and water solution can be recovered as nearly pure glycol and water solution for recycling purposes. In one embodiment, in excess of 99% of the recovered permeate was determined to be a pure glycol and water solution. Consequently, not only are the disposable waste products which may be deemed hazardous waste significantly reduced, but the costs for providing engine coolant can be partly recovered through the recycled ethylene glycol and water solution.

While preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. Apparatus for recycling engine coolant comprising:
   concentrate container means for retaining engine coolant to be recycled, said concentrate container means having an inlet and an outlet;
   permeate container means for retaining recovered engine coolant, said permeate container means having an inlet;
   flow path means for defining a fluid flow path extending from said concentrate outlet to said permeate inlet and said concentrate container inlet;
   circulation means for circulating fluid along said flow path;
   filtration means interposed in said flow path for filtering particulate matter from said coolant to form a filtered coolant solution;
   pressurizing means for pressurizing said filtered coolant solution to form a feed stream;
   separator means comprising a semi-permeable membrane interposed in said flow path for separating glycols from said feed stream filtered coolant solution by a reverse osmosis process to form a first stream of glycol and water permeate solution and a second stream of separated concentrate coolant solution;
   conduit means for directing said permeate solution to said permeate inlet; and
   return means for returning said separated concentrate coolant solution to said concentrate inlet.

2. The apparatus of claim 1 wherein said pressurizing means further comprises means for pressurizing the coolant to a pressure in excess of 50 psi.

3. The apparatus of claim 1 wherein said separator means comprises a housing and a generally cylindrical semi-permeable membrane mounted in said housing and defining a first outer side and a second inner side, wherein filtered pressurized coolant is fed along the first side and the permeate solution is separated for flow along said second side.

4. The apparatus of claim 1 wherein said filtration means comprises a plurality of filter stages having progressive filter elements with decreasing filter porosity diameters.

5. The filtration system of claim 1 wherein said filtration means comprises three filters having 50, 20 and 5 microns respective porosity ratings.

6. The apparatus of claim 1 further comprising a heat exchanger means for maintaining the concentrate temperature at less than 120° F.

7. The apparatus of claim 1 further comprising pressure control means for terminating operation of said apparatus in the event that the pressure of the system does not exceed a pre-established threshold.

8. The apparatus of claim 1 further comprising dampening means for dampening the turbulence of said pressurized filtered coolant.

9. The apparatus of claim 1 further comprising temperature control means for terminating operation of said system in the event that the temperature of said coolant exceeds 120° F.

10. The apparatus of claim 1 wherein the semi-permeable membrane is composed of fluoridated hydrocarbon material.

11. The apparatus of claim 1 wherein the semi-permeable membrane has a spiral configuration and spacer means are interposed between spiral layers of said membrane.

12. The apparatus of claim 1 wherein said first stream is approximately 2-4% by volume of said feed stream.

13. The apparatus of claim 1 wherein the flux rate of solution passing through said membrane to form said first stream is approximately 5 gallons per square feet of membrane surface per 24 hours.

14. The apparatus of claim 1 wherein the rate of flow of said separated concentrated coolant solution in said return means is at least 10 times the rate of flow of permeate solution in the conduit means.

15. The apparatus of claim 1 wherein the feed stream has a pressure in the range of 100 to 400 psi.

16. Apparatus for recycling engine coolant comprising:
   concentrate container means for retaining engine coolant to be recycled;
   permeate container means for retaining recovered engine coolant;
   flow path means for defining a fluid flow path extending from said concentrate container means to said permeate container means;
   circulation means for circulating coolant along said flow path;
   pressurizing means for pressurizing said coolant to form a feed stream;
   separator means comprising a semi-permeable membrane interposed in said flow path for separating glycol and water from said feed stream solution by a reverse osmosis process to form a first stream of glycol and water permeate solution and a second stream of separated concentrate coolant solution;

conduit means for directing said permeate solution to said permeate container means; and return means for returning said separated concentrate coolant solution for recirculation in said feed stream.

17. The apparatus of claim 16 wherein said pressurizing means pressurizes said feed stream to a pressure between 100 and 400 psi.

18. The apparatus of claim 16 wherein said separator means comprises a housing and a generally cylindrical semi-permeable membrane mounted in said housing and defining an outer channel and an inner channel, wherein said feed stream pressurized coolant is fed along the outer channel and the permeate solution is separated for flow along said inner channel.

19. The apparatus of claim 16 further comprising filtration means upstream from said separator means and comprising a plurality of filter stages having progressive filter elements with decreasing filter porosity ratings.

20. The apparatus of claim 16 wherein the semi-permeable membrane is composed of fluoridated hydrocarbon material.

21. The apparatus of claim 16 wherein the semi-permeable membrane has a spiral configuration and spacer means are interposed between spiral layers of said membrane.

22. The apparatus of claim 16 wherein said first stream is approximately 2-4% by volume of said feed stream.

23. The apparatus of claim 16 further comprising heat exchanger means for maintaining the temperature of the concentrate below a pre-established threshold.

24. The apparatus of claim 16 further comprising temperature control means for terminating operation of the apparatus if the temperature exceeds a pre-established threshold.

25. The apparatus of claim 16 further comprising pressure control means for terminating operation of the apparatus if the pressure exceeds a pre-established threshold.

26. A process for recycling engine coolant comprising:

continuously circulating engine coolant along a flow path;

filtering particulate matter from the coolant in said flow path;

pressurizing the coolant to form a feed stream;

passing said feed stream along a semi-permeable membrane to separate glycol and water from said feed stream by reverse osmosis to form a first stream of glycol and water permeate solution and a second stream of separated concentrated solution; and returning said separated concentrate coolant to said flow path.

27. The process of claim 26 further comprising pressurizing the feed stream to a pressure in the range of 100 to 400 psi.

28. The process of claim 26 further comprising maintaining the temperature of said feed stream at a temperature less than 120° F.

29. The process of claim 26 further comprising the steps of adding pure glycol solution to said permeate to form a solution by having a pre-established glycol concentration.

30. The process of claim 29 further comprising adding corrosion inhibitors to said solution and mixing same.

31. The process of claim 30 further comprising adding stabilizers to prevent the precipitation of inhibitors.

32. The process of claim 26 further comprising controlling the rate of flow through said membrane so that said first stream is approximately 2-4% by volume of the feed stream.

33. The process of claim 26 further comprising diverting the feed stream from said membrane if the pressure of said feed stream exceeds a pre-established threshold.

* * * * *